United States Patent Office 3,435,081
Patented Mar. 25, 1969

3,435,081
PROCESS FOR THE PRODUCTION OF HEXA-CHLOROMETHANOINDENE ISOMER
Louis P. Wilks and Sidney B. Richter, Chicago, Ill., assignors to Velsicol Chemical Corporation, Chicago, Ill., a corporation of Illinois
No Drawing. Continuation-in-part of application Ser. No. 306,696, Sept. 5, 1963. This application Feb. 10, 1966, Ser. No. 526,341
Int. Cl. C07c 17/00, 25/22
U.S. Cl. 260—648          8 Claims

ABSTRACT OF THE DISCLOSURE

The method for the preparation of isomers of 4,5,6,7,8,8 - hexachloro-3a,4,7,7a-tetrahydro-4,7-methanoindene, said indene compound having a melting point of about 210°–211° C. under nitrogen, which comprises isomerizing said indene compound by heating said indene compound to a temperature below about 200° C. in the presence of free-radical initiating catalytic compounds for a period of at least about one hour.

---

This application is a continuation-in-part of Ser. No. 306,696, filed Sept. 5, 1963, now abandoned, which in turn is a continuation-in-part of Ser. No. 88,300, filed Feb. 10, 1961, now abandoned.

This invention relates to a method for the preparation of pesticidal compositions of matter. More specifically, this invention relates to a new and novel method for the preparation of the alpha-, beta- and gamma-isomers of 4,5,6,7,8,8 - hexachloro-3a,4,7,7a-tetrahydro-4,7-methanoindene, said indene compound having a melting point of about 210°–211° C. under nitrogen. This indene compound will be referred to hereinafter as Compound A for brevity.

Compound A is a crystalline compound which can be obtained by the equimolecular, Diels-Alder addition of cyclopentadiene and hexachlorocyclopentadiene. Compound A is a useful chemical intermediate, but it has not shown to be toxic to noxious weeds such as crabgrass.

It has been found, however, that certain isomers of Compound A which can be prepared by the method of this invention have unexpectedly and surprisingly shown a high degree of toxicity to crabgrass, toward which the parent Compound A shows no appreciable toxicity. The fact that the compounds produced in the method of this invention are true chemical isomers was shown by their all having the same molecular formula of $C_{10}H_6Cl_6$ on elemental analysis while they all have markedly differing physical properties.

Thus, Compound A itself has a melting point (under nitrogen) of 210° to 211° C. One of the isomers of Compound A which is nontoxic to crabgrass and which is identified as alpha-A, has a melting point after repeated recrystallization of 193.0° to 194.5° C. Another isomer of Compound A which has marked toxicity to crabgrass and which will be identified as beta-A, has a melting point after repeated recrystallization of 146.3° to 147° C. Still another isomer of Compound A which is toxic to crabgrass and which will be identified as gamma-A, has a melting point after repeated recrystallization of 102° to 103° C. In addition, these isomers have distinct infrared spectra, ultraviolet spectra, and gas chromatograms which can be used in their identification.

For example, Compound A has an infrared absorption spectrum with strong bands at 13.5 and 14.8 microns, medium bands at 10.0, 11.0, 11.1, and 14.025 microns, and weak bands at 10.5, 12.025, 12.325, and 13.225 microns. Alpha-A has an infrared absorption spectrum with strong bands at 6.3, 10.925, 12.85, and 14.55 microns and medium bands at 10.1 and 13.825 microns. Beta-A has an infrared absorption spectrum with strong bands at 6.3, 10.4, 10.75, and 12.75 microns and medium bands at 10.075, 11.65, 13.7–13.08, and 14.4 microns. Gamma-A has an infrared absorption spectrum strong bands at 6.3, 11.65, 13.125, and 14.35 microns, medium bands at 10.19, 11.325, and 13.95 microns, and a weak band at 13.65 microns. In these spectra, the strong bands are those at less than 40% transmission, medium bands are those at 40–60% transmission, and weak bands are those at more than 60% transmission.

This analysis of the products of the present process discloses that each is an unsaturated compound containing at least one $ClC{=}CCl$ grouping. This is shown by the infrared analysis of each isomer having a peak at 6.3 microns. This has been confirmed by dechlorinating each of the isomeric products with lithium and hydrogenating the dechlorinated product. As to the beta- and gamma-isomers of 4,5,6,7,8,8-hexachloro-3a,4,7,7a-tetrahydro-4,7-methanoindene the latter procedure has indicated the presence of two of these groupings.

When Compound A is subjected to the method of this invention, the reaction product contains a mixture of alpha-A, beta-A, gamma-A, some unreacted Compound A, and other byproducts normally arising in the isomerization process, depending on the exact reaction conditions used. If desired, the individual isomers can be separated by fractional crystallization, distillation, chromatography, or other techniques known to the art. However, in practice this separation is unnecessary, since the reaction product from the method of this invention contains a high proportion of the active isomers and is itself markedly toxic to crabgrass. Indeed, the beta- and gamma-isomers of Compound A have shown evidence of synergistic activity with one another, and it is often desirable to use them in combination.

The method of this invention comprises isomerizing Compound A by heating Compound A to a temperature below about 200° C. in the presence of free-radical initiating catalysts. It is also often desirable to use suitable solvents to facilitate the process of this invention, although the process can be carried out satisfactorily by heating Compound A with catalyst but without solvent. Solvents of the hydrocarbon and halogenated hydrocarbon class are preferred. Typical examples of suitable hydrocarbon solvents are benzene, toluene, heptane, xylene, octane, nonane, hexane, and such chlorinated hydrocarbons as chlorobenzene, o - dichlorobenzene, p - dichlorobenzene, 1,2,4 - trichlorobenzene, carbon tetrachloride, trichloroethylene, 1,2-dichloroethane, chloroform, hexachlorobutadiene, perchloroethylene, and sym-tetrachloroethane.

The catalysts suitable for use in the process of this invention are known in the art as free-radical-initiating compounds. Typical of such compounds are the organic peroxy compounds, which contain the —O—O— linkage and include such compounds as benzoyl peroxide, di-t-butyl peroxide, t-butyl perbenzoate, t-butyl hydroperoxide, cumene hydroperoxide, diisopropylbenzene hydroperoxide, methane hydroperoxide, acetyl peroxide, and p-chlorobenzoyl peroxide. These organic peroxy compounds are preferred because they generally produce high yields of the desired isomers. The exact mechanism by which the isomerization process of this invention takes place is not fully known. It is believed to involve the addition of a free radical, generated by the catalyst, to the nonhalogenated double bond of Compound A. The organic peroxy compounds are well known to vary in their ability to form free radicals, and for this reason not all the organic peroxy compounds are equally satisfactory as catalysts in the method of this invention. Some, for example, require relatively high reaction temperatures and prolonged reaction times in order to catalyze the isomerization process.

It has been found that benzoyl peroxide, di-tert-butyl peroxide, tert-butyl perbenzoate, and tert-butyl hydroperoxide are among the most preferred organic peroxy compounds for use in the method of this invention.

Other suitable but not fully equivalent free-radical-initiating catalysts include azobisisobutyronitrile; the inorganic peroxides such as hydrogen peroxide, sodium peroxide, calcium peroxide, and potassium peroxide; persalts such as sodium persulfate, ammonium persulfate, potassium persulfate, sodium perborate, and potassium perdicarbonate; chlorine-radical-initiators such as chlorine and sulfuryl chloride; hydrazine compounds such as hydrazine sulfate, hydrazine hydrochloride, and dibenzoyl hydrazine; and organometallic compounds such as tetraethyl lead.

The amount of catalyst to be used in the method of this invention can be about 30% or less based on the weight of Compound A employed. It is preferred to use about 15% or less of catalyst by weight of Compound A, and it is most preferred to use from about 0.5 to 5% of catalyst on the same weight basis. While the total amount of catalyst can be charged into the initial reaction mixture, it has been found advantageous to add the catalyst gradually in portions during the course of the reaction.

Particularly suitable catalysts for the method of this invention are mixtures which comprise at least one organic peroxy compound and at least one free-radical-initiating catalyst other than an organic peroxy compound. When mixtures of the latter type are used, it is preferred that the organic peroxy compounds shall comprise not less than about 10% nor more than about 50% by weight of the catalyst mixture.

It has been found that a particularly useful component of this combination of catalysts as a free radical initiating catalyst other than an organic peroxy compound is sulfuryl chloride.

The temperature at which the process of this invention can be carried out depends on the half-life of the specific catalyst used in the process. Half-life data on the catalysts can be found in various reference books. One source of this invention is a publication of the Wallace and Tiernan, Inc. entitled "Evaluation of Organic Peroxides From Half-Life Data." This publication written by Orville L. Mageli, Suzanne D. Bukata and Douglas J. Bolton contains charts correlating half-lifes of the chemicals as a function of temperature.

It is desirable to have the present reaction proceed at an effiicent rate in order to minimize the necessary reaction time. Accordingly the temperature of the reaction system should be maintained so that the half-life of the catalyst is between about 0.1 to about 20 hours. For optimum results the temperature should be maintained so that the half-life of the catalyst is between about 0.5 to about 5 hours.

Accordingly it can be seen that the temperature at which this process can be best performed will vary with the identity of the catalyst. In general this temperature will be between about 30° C. and about 200° C. and usually between about 60° C. and about 160° C. Naturally this temperature will influence the choice of solvent since it is convenient to carry out the process at atmospheric pressure, although sub- or super-atmospheric pressures can be used.

The process is carried out until the desired degree of conversion of Compound A to its isomers takes place. The course of this conversion can be followed readily by gas chromatography, infrared spectrum analysis, ultraviolet spectrum analysis, or other techniques known to the art. The exact reaction time will depend upon the reaction temperature, the activity of the particular catalyst, and other factors. However, a minimum reaction time of about one hour is preferred, and a minimum reaction time of about two hours is most preferred.

Similarly, the product can be worked up by any of the recognized techniques known to the art, such as distillation, crystallization, or chromatography. The product obtained by the process of this invention will ordinarily be a composition which comprises alpha-A, beta-A, gamma-A, some unreacted Compound A, and other by-products normally arising in the isomerization process. Although the pure isomers can be isolated from the reaction product by chromatography and recrystallization, for example, this is not necessary. The crude reaction product remaining after removal of any solvents or excess catalyst contains a high proportion of the herbicidally toxic isomers and can be formulated directly for pesticidal use without further purification.

The following examples illustrate the manner in which the process of this invention can be carried out. All temperatures are in degrees centigrade.

EXAMPLE 1

Preparation of Compound A

Hexachlorocyclopentadiene heated to 70°–80° was stirred while an equimolecular quantity of cyclopentadiene was added. A small amount of heptane was then added to maintain a slurry, and the mixture was stirred in a sealed vessel at 70°–80° with external cooling for about 20 minutes. The mixture was then stirred and heated at 150–160° for about 40 minutes, cooled, and steam distilled. The residue was filtered and dried to give a nearly quantitative yield of crystalline product which was shown by infrared spectrum analysis to contain 96.4% of 4,5,6,7,8,8 - hexachloro - 3a,4,7,7a - tetrahydro - 4,7 - methanoindene, which after recrystallization from methanol has a melting point of 210°–211° (under nitrogen).

EXAMPLE 2

Isomerization of Compound A and separation of isomers

Compound A (50 parts by weight) prepared as described in Example 1 was dissolved in 195 parts by weight of carbon tetrachloride in a reaction vessel fitted with stirring apparatus, internal thermometer, and provision for reflux. A solution of 5 parts of benzoyl peroxide in 150 parts of carbon tetrachloride was then added at 80° over a period of 6 hrs. The reaction mixture was then stirred and refluxed for 4 hrs. and cooled.

The solvent from about one liter of this reaction product was stripped for about 2 hrs. at 80°–100° to give 34.7 g. of an oily residue which was found by infrared spectrum analysis to contain about 22% alpha-A, 12% beta-A, 28% gamma-A, and only 8% unchanged Compound A.

The oily residue was treated with 200 ml. of pentane, and the precipitated solid was filtered, recrystallized from acetone (Nuchar), and dried to give white crystals of alpha-A, M.P. 193–195°.

*Analysis.*—$C_{10}H_6Cl_6$. Theory: C, 35.44%; H, 1.79%; Cl, 62.78%. Found: C, 35.89%; H, 1.75%; Cl, 62.10%.

The pentane filtrate remaining after removal of the alpha-A was concentrated to a small volume and passed through a column of 1500 g. of Florex XXS fuller's earth with pentane as the eluant. Sixteen 250-ml. fractions were taken, followed by one with ether. The first 3 fractions were combined, and the pentane was stripped off to give an oily residue, which was taken up in more pentane, filtered, and chilled. The solid which separated was recrystallized from pentane to give white crystals of beta-A, M.P. 143–144.5°.

*Analysis.*—$C_{10}H_6Cl_6$. Theory: C, 35.44%; H, 1.79%; Cl, 62.78%. Found: C, 36.01%; H, 1.87%; Cl, 62.44%.

Removal of the solvent from fraction 7 of the Florex XXS eluant gave an oily residue, which was redissolved in pentane and passed through a column of 80 parts by weight of silica gel, pentane again being used as the eluant. The four 100-ml. fractions taken were found to contain the bulk of the unchanged Compound A. The column was then eluated with ether, and the solvent was removed from the eluants to give an oily residue. The oil was dissolved in pentane and passed through a column of 80 parts by weight of Florex XXS with pentane eluant. The solvent was removed from fraction 4 of the 50-ml. fractions to give an oily residue which solidified. The solid was recrystallized from methanol to give white crystals of gamma-A, M.P. 97–98°.

*Analysis.*—$C_{10}H_6Cl_6$. Theory: C, 35.44%; H, 1.79%; Cl, 62.78%. Found: C, 35.87%; H, 1.69%; Cl, 62.26%.

EXAMPLE 3

Isomerization of Compound A with benzoyl peroxide and sulfuryl chloride

Into a one-liter, round-bottomed flask fitted with a heating mantle, reflux condenser, and dropping funnel was placed a 20% solution by weight of Compound A (100 g.) in carbon tetrachloride. Benzoyl peroxide (3.5 g.) was added, and the solution was stirred and heated at reflux temperature while sulfuryl chloride (10 g.) was added dropwise over a 3-hr. period. The mixture was then refluxed for an additional 4 hrs., after which the solvent was stripped in vacuo. The residue, which was found to be highly toxic to crabgrass, was found by infrared spectrum analysis and gas chromatographic analysis to contain by weight approximately 18% alpha-A, 15% beta-A, 27% gamma-A, 3% unreacted Compound A, and 37% other materials.

EXAMPLE 4

Isomerization of Compound A with di-tert-butyl peroxide

A 5-ml. aliquot of a 20% solution by weight of Compound A in 1,2,4-trichlorobenzene was placed in a test tube, and 3.5% of di-tert-butyl peroxide was added. The tube was stoppered and placed in an oven at 150° for 8 hrs. An additional 3.5% of the peroxide was added each hour. At the end of 8 hrs., the reaction mixture was cooled and analyzed by vapor phase gas chromatography and infrared spectrum analysis. It was found to contain approximately, by weight, 25% unreacted Compound A, 23% alpha-A, 16% beta-A, and 36% gamma-A.

EXAMPLE 5

Isomerization of Compound A with tert-butyl perbenzoate

A 5-ml. aliquot of a 20% solution by weight of Compound A in 1,2,4-trichlorobenzene was placed in a test tube, and 3.5% tert-butyl perbenzoate was added. The tube was stoppered and placed in an oven at 150° for 8 hrs. An additional 3.5% of the perbenzoate was added each hour. At the end of 8 hrs., the reaction mixture was cooled and analyzed by vapor phase gas chromatography and infrared spectrum analysis. It was found to contain approximately, by weight, 7% unreacted Compound A, 20% alpha-A, 19% beta-A, and 54% gamma-A.

EXAMPLE 6

Isomerization of Compound A with tert-butyl hydroperoxide

A 5-ml. aliquot of a 20% solution by weight of Compound A in 1,2,4-trichlorobenzene was placed in a test tube, and 3.5% of tert-butyl hydroperoxide was added. The tube was stoppered and placed in an oven at 150° for 8 hrs. An additional 3.5% of the hydroperoxide was added each hour. At the end of 8 hrs., the reaction mixture was cooled and analyzed by vapor phase gas chromatography. It was found to contain approximately, by weight, 63% unreacted Compound A, 10% alpha-A, and 26% of a mixture of beta-A and gamma-A.

EXAMPLE 7

Isomerization of Compound A at high temperature

Compound A (100 g.) is placed with 400 ml. of diphenyl ether in a 1-liter flask fitted with a mechanical stirrer, reflux condenser, internal thermometer, and dropping funnel. The mixture is stirred and heated at a temperature of about 190° while a solution of 15 g. of benzoyl peroxide in 100 ml. of diphenyl ether is added dropwise over a period of 2 hrs. The cooled reaction mixture will contain the desired isomers of Compound A, some unreacted Compound A, and other products arising from the reaction. The alpha-A is quite insoluble in most solvents, and some of its will often be in solid form in the cooled reaction mixture and can be filtered off. The filtrate can be washed with dilute sodium carbonate solution and then with water, dried over magnesium sulfate, filtered, and reduced by distilling off the solvent under reduced pressure. The residue will contain the desired isomers which can be isolated as described in Example 2.

EXAMPLE 8

Isomerization of Compound A in dichlorobenzene

The apparatus described in Example 7 is charged with 100 g. of Compound A and 400 ml. of o-dichlorobenzene. The mixture is stirred and heated at a temperature of about 160° while a solution of 0.5 g. benzoyl peroxide in 50 ml. o-dichlorobenzene is added dropwise during 1 hr. The reaction mixture can then be worked up as described in Example 7.

EXAMPLE 9

Isomerization of Compound A with acetyl peroxide

The apparatus described in Example 7 is charged with 100 g. of Compound A and 400 ml. of carbon tetrachloride. The mixture is stirred and heated at a temperature of about 30° while a solution of 30 g. of acetyl peroxide in 200 ml. carbon tetrachloride is added dropwise over a period of 7 hrs. The reaction mixture can then be worked up as described in Example 7.

EXAMPLE 10

Isomerization of Compound A with portionwise addition of benzoyl peroxide

The apparatus described in Example 7 is charged with 100 g. of Compound A, 400 ml. of carbon tetrachloride, and 2.0 g. of benzoyl peroxide. The mixture is stirred and refluxed while a solution of 3.0 g. of benzoyl peroxide in 100 ml. carbon tetrachloride is added dropwise during 3 hrs. The reaction mixture can then be worked up as described in Example 7.

EXAMPLE 11

Isomerization of Compound A with tert-butyl perbenzoate and sulfuryl chloride

The apparatus described in Example 7 is altered to the extent that a 4-necked, 1-liter flask is used, and it is fitted with two rather than one dropping funnel. The flask is charged with 100 g. of Compound A, 400 ml. carbon tetrachloride, and 2.0 g. of tert-butyl perbenzoate. The mixture is stirred and refluxed while a solution of 5.5 g. of tert-butyl perbenzoate in 100 ml. carbon tetrachloride and a solution of 7.5 g. of sulfuryl chloride in 100 ml. carbon tetrachloride are added dropwise and simultaneously during 3 hrs. The reaction mixture can then be worked up as described in Example 7.

EXAMPLE 12

Isomerization of Compound A with tert-butyl hydroperoxide and sulfuryl chloride

The apparatus described in Example 7 is charged with 100 g. of Compound A, 400 ml. carbon tetrachloride, and 3.0 g. of tert-butyl hydroperoxide. The mixture is stirred and refluxed while sulfuryl chloride (27 g.) is added dropwise during 2 hrs. The reaction mixture can then be worked up as described in Example 7.

We claim:
1. The method for the preparation of isomers of 4,5,6,7,8,8-hexachloro-3a,4,7,7a-tetrahydro - 4,7-methanoindene, said indene compound having a melting point of about 210–211° C. under nitrogen, which comprises isomerizing said indene compound by heating said indene compound to a temperature between about 60° C. and about 200° C. in the presence of from about 0.5 to about 30% by weight of free-radical initiating catalytic compounds having a half-life between about 0.1 to about 20 hours selected from the group consisting of benzoyl peroxide, di-t-butyl peroxide, t-butyl perbenzoate, t-butyl hydroperoxide, cumene hydroperoxide, diisopropylbenzene hydroperoxide, methane hydroperoxide, acetyl peroxide, p-chlorobenzoyl peroxide, azobisisobutyronitrile, hydrogen peroxide, sodium peroxide, calcium peroxide, potassium peroxide, sodium persulfate, ammonium persulfate, potassium persulfate, sodium perborate, potassium perdicarbonate, chlorine sulfuryl chloride, hydrazine sulfate, hydrazine hydrochloride dibenzoyl hydrazine and tetraethyl lead at the isomerization temperature for a period of at least about one hour.

2. The method of claim 1 wherein the heating is carried out in a solvent for the indene compound selected from the group consisting of hydrocarbons and halogenated hydrocarbons solvents.

3. The method of claim 1 wherein the catalytic compounds are organic peroxy compounds.

4. The method of claim 1 wherein the catalytic compound is benzoyl peroxide.

5. The method of claim 1 wherein the catalytic compound is a chlorine-radical initiator selected from the group consisting of sulfuryl chloride and chlorine.

6. The method of claim 1 wherein the free-radical initiating catalytic compounds are up to about 30% by weight of the indene compound of a mixture containing at least one organic peroxy component and at least one chlorine-radical intiator selected from the group consisting of sulfuryl chloride and chlorine.

7. The method for the preparation of isomers of 4,5,6,7,8,8-hexachloro-3a,4,7,7a-tetrahydro - 4,7-methanoindene, said indene compound having a melting point of about 210–211° C. under nitrogen, which comprises isomerizing said indene compound by heating said indene compound to a temperature between about 60° C. and about 200° C. in the presence of from about 0.5 to about 30% by weight of a mixture of free-radical initiating catalytic compounds having a half-life between about 0.1 to about 20 hours at the isomerization temperature containing at least one organic peroxy compound selected from the group consisting of benzoyl peroxide, di-t-butyl peroxide, t-butyl perbenzoate, t-butyl hydroperoxide, cumene hydroperoxide, diisopropylbenzene hydroperoxide, methane hydroperoxide, acetyl peroxide p-chlorobenzoylperoxide and sulfuryl chloride for a period of at least about one hour in a solvent selected from the group consisting of hydrocarbon and halogenated hydrocarbon solvents.

8. The method for the preparation of isomers of 4,5,6,7,8,8-hexachloro-3a,4,7,7a-tetrahydro - 4,7 - methanoindene, said indene compound having a melting point of about 210–211° C. under nitrogen, which comprises isomerizing said indene compound by heating said indent compound to a temperature between about 60° C. and about 200° C. in the presence of from about 0.5 to about 30% by weight of a mixture of free-radical initiating catalytic compounds having a half-life between about 0.1 to about 20 hours at the isomerization temperature containing benzoyl peroxide and sulfuryl chloride in carbon tetrachloride solvent.

References Cited

UNITED STATES PATENTS 2,519,190   8/1950   Hyman.

LEON ZITVER, *Primary Examiner.*

M. JACOB, *Assistant Examiner.*

U.S. Cl. X.R.

71—126